United States Patent
Flockhart et al.

(10) Patent No.: US 8,644,491 B2
(45) Date of Patent: Feb. 4, 2014

(54) MECHANISM FOR MULTISITE SERVICE STATE DESCRIPTION

(75) Inventors: Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1144 days.

(21) Appl. No.: 12/545,386

(22) Filed: Aug. 21, 2009

(65) Prior Publication Data
US 2011/0047002 A1 Feb. 24, 2011

(51) Int. Cl.
*H04M 3/00* (2006.01)

(52) U.S. Cl.
USPC .................................. 379/265.12; 379/265.01

(58) Field of Classification Search
USPC ............................ 379/265.01–265.02, 265.12
See application file for complete search history.

(56) References Cited

U.S. PATENT DOCUMENTS

| | | |
|---|---|---|
| 3,689,132 A | 9/1972 | Baker |
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,174,700 A | 12/1992 | Sgarbi et al. |
| 5,178,898 A | 1/1993 | Juchem |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,329,579 A | 7/1994 | Brunson |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

U.S. Appl. No. 10/815,534, filed Mar. 31, 2004, Kiefhaber.

(Continued)

*Primary Examiner* — Rasha Al Aubaidi
(74) *Attorney, Agent, or Firm* — Sheridan Ross P.C.

(57) ABSTRACT

A distributed contact center is described and systems, methods, and devices for sharing state information between the various parts of the contact center are provided. Skill state information is condensed into one or several bits such that a message describing the state of multiple skills can be generated and shared with other parts of the contact center. This provides the ability to convey a large amount of state information for a particular site in a multi-site system without consuming a large amount of bandwidth or utilizing a large amount of processing capabilities.

19 Claims, 5 Drawing Sheets

(56) References Cited

U.S. PATENT DOCUMENTS

| | | |
|---|---|---|
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,940,498 A | 8/1999 | Bardl |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,979,117 A | 11/1999 | Fuller |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,229,888 B1 * | 5/2001 | Miloslavsky ............ 379/265.01 |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,289,969 B1 | 9/2001 | Outten et al. |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Burok et al. |
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,785,380 B2 | 8/2004 | Ribera |
| 6,947,543 B2 | 9/2005 | Alvarado et al. |
| 7,035,808 B1 | 4/2006 | Ford |

(56) References Cited

U.S. PATENT DOCUMENTS

| | | | |
|---|---|---|---|
| 7,035,927 B2 | 4/2006 | Flockhart et al. | |
| 7,200,219 B1 | 4/2007 | Edwards et al. | |
| 7,295,669 B1 | 11/2007 | Denton | |
| 7,417,989 B1 | 8/2008 | Doran | |
| 7,444,139 B1 | 10/2008 | Welch et al. | |
| 7,500,241 B1 | 3/2009 | Flockhart et al. | |
| 7,574,736 B2 | 8/2009 | Salapaka et al. | |
| 2002/0065827 A1* | 5/2002 | Christie et al. | 707/10 |
| 2002/0072618 A1 | 6/2002 | Afzali-Ardakani et al. | |
| 2002/0178273 A1 | 11/2002 | Pardo-Castellote et al. | |
| 2002/0194002 A1 | 12/2002 | Petrushin | |
| 2003/0093465 A1 | 5/2003 | Banerjee et al. | |
| 2003/0120789 A1 | 6/2003 | Hepworth et al. | |
| 2003/0174830 A1 | 9/2003 | Boyer et al. | |
| 2003/0177017 A1 | 9/2003 | Boyer et al. | |
| 2004/0003046 A1 | 1/2004 | Grabelsky et al. | |
| 2004/0203878 A1 | 10/2004 | Thomson | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2006/0015388 A1 | 1/2006 | Flockhart et al. | |
| 2006/0067506 A1 | 3/2006 | Flockhart et al. | |
| 2006/0098625 A1 | 5/2006 | King et al. | |
| 2006/0173921 A1 | 8/2006 | Jalonen | |
| 2007/0072618 A1 | 3/2007 | Freytsis et al. | |
| 2007/0263787 A1 | 11/2007 | Dong et al. | |
| 2007/0299680 A1 | 12/2007 | Fama et al. | |
| 2008/0084831 A1 | 4/2008 | Sylvain | |
| 2009/0238359 A1 | 9/2009 | Ely et al. | |
| 2009/0279436 A1 | 11/2009 | Chin et al. | |
| 2010/0128720 A1* | 5/2010 | Goss | 370/352 |

FOREIGN PATENT DOCUMENTS

| | | |
|---|---|---|
| DE | 102006031080 | 1/2008 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| EP | 1643743 | 4/2006 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 10/815,556, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Kiefhaber.
U.S. Appl. No. 10/946,638, filed Sep. 20, 2004, Flockhart et al.
U.S. Appl. No. 11/619,504, filed Jan. 3, 2007, Davis et al.
U.S. Appl. No. 12/239,120, filed Sep. 26, 2008, Steiner et al.
U.S. Appl. No. 12/469,523, filed May 20, 2009, Steiner.
U.S. Appl. No. 12/564,831, filed Sep. 21, 2009, Flockhart et al.
"Applications, NPRI's Predictive Dialing Package," Computer Technology (Fall 1993), p. 86.
"Domain Name Services," available at http://www.psm.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, CRC Information Systems, Inc., Tel-Athena, Sectional 5—Company C520, p. 95, 1992.
"The Advantages of Load Balancing in the Multi-Call Center Enterprise," Avaya Inc. White Paper (Feb. 2002), pp. 1-13.
"The Dynamic Data Center", The Burton Group, Jun. 11, 2008, pp. 1-30.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
"Call Center Software You Can't Outgrow," Telemarketing® (Jul. 1993), p. 105.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.belisouth.neU NASApp/DNSWebUI/FAQ.jsp, downloaded Mar. 31, 2003,4 pages.
CentreVu Advocate Release 9 User Guide, Avaya Inc., 585-215-953, Issue 1 (Dec. 2000), pp. 1-210.
Chavez, David, et al., "Avaya MultiVantage Software: Adapting Proven Call Processing for the Transition to Converged IP Networks," Avaya, Inc., Aug. 2002, pp. 1-20.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
Definity Communications System Generic 3 Call Vectoring/Expert Agent Selection (EAS) Guide, AT&T publication No. 555-230-520 (Issue 4, Sep. 1995).
Doo-Hyun Kim et al. "Collaborative Multimedia Middleware Architecture and Advanced Internet Call Center," Proceedings at the International Conference on Information Networking (Jan. 31, 2001), pp. 246-250.
Douglas W. Stevenson et al., "Name Resolution in network and Systems Management Environments," available at http://netman.cit.buffalo.edu/Doc/Dstevenson/NR-NMSE.html, downloaded Mar. 31, 2003, 16 pages.
E. Noth et al., "Research Issues for the Next Generation Spoken": University of Erlangen-Nuremberg, Bavarian Research Centre for Knowledge-Based Systems, at http://www5.informatik.unierlangen.de/literature/psdir/1999/Noeth99:RIF.ps.gz 16 pages.
Foster, Robin, et al., "Avaya Business Advocate and its Relationship to Multi-Site Load Balancing Applications," Avaya, Inc., Mar. 2002, 14 pages.
Geotel Communications Corporation Web site printout entitled "Intelligent CallRouter" Optimizing the Interaction Between Customers and Answering Resources., 1998, 6 pages.
Hill, "Contact Center on Demand: An opportunity for telcos to be leaders in the grid-computing revolution," Telephony Online, Jul. 2, 2003, pp. 1-5.
John H.L. Hansen and Levent M. Arsian, Foreign Accent Classification Using Source Generator Based Prosodic Features, IEEE Proc. ICASSP, vol. 1, pp. 1-4, Detroit USA (May 1995).
L.F. Lamel and J.L. Gauvain, Language Identification Using Phone-Based Acoustic Likelihood, ICASSP-94, 4 pages, Submitted on Oct. 13, 2009.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-32.

(56) References Cited

OTHER PUBLICATIONS

Levent M. Arsian, Foreign Accent Classification in American English, Department of Electrical Computer Engineering, Duke University, Thesis, pp. 1-218 (1996).

MIT Project Oxygen, Pervasis, Human-Centered Computing (MIT Laboratory for Computer Science) (Jun. 2000) pp. 1-15.
Presentation by Victor Zue, The MIT Ox90ygen Project, MIT Laboratory for Computer Science (Apr. 25-26, 2000) 9 pages.

* cited by examiner

MECHANISM FOR MULTISITE SERVICE STATE DESCRIPTION

FIELD

The present invention is directed generally to communications and more particularly to contact centers.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day Automated Contact Distributors (ACDs) when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Best service routing is one example of a routing logic used in centralized and distributed contact centers. In current best service routing, each ACD in the contact center uses a single message to represent a single skill and further describe the state of that skill. Copies of this single skill message are transmitted to all other ACDs in the contact center, thereby updating every ACD with the same state information for the transmitting ACD. By keeping each ACD in a contact center aware of all other ACD states, a uniform work item routing logic can be applied by all ACDs and intelligent routing decisions can be made in a distributed contact center.

One problem with current best service routing algorithms is that they consume a large amount of network bandwidth due to the fact that a single message has to be used for a single skill. Therefore, if a contact center has a thousand skills to describe an ACD has to send a thousand messages every predetermined period of time to update all other ACDs as to the skill status for every skill. If a contact center has three remote locations each having their own ACD, then a single ACD must send two thousand messages to describe the state of every skill to the other ACDs. Further exacerbating the problem is that the other two ACDs are required to also send two thousand messages every predetermined period of time. These additional messages place further burdens on the communication network connecting the ACDs.

As can be appreciated by one skilled in the art, the over utilization of the network bandwidth is not desired. Accordingly, the current solution is to greatly increase the amount of time between status updates. Most contact centers employing best service routing only have ACDs send out status updates once every 20 to 30 seconds or so. Increasing the frequency of status updates any more would increase network usage costs greatly and/or result in network congestion. It is highly desirable to receive and send more status updates to help create informed work item routing decisions. But, given the bandwidth limitations of most networks, it is impractical to accommodate such high frequency status updates.

SUMMARY

It is thus one aspect of the present invention to provide an ACD that is capable of utilizing a single byte of data to indicate excess work items or excess resources for a particular skill at a particular contact center location in a multisite contact center and further describe the state of that skill with enough specificity that the state information can be used to make work item routing decisions in the multisite contact center.

A large number of variables (e.g., number of available agents, number of work items currently in queue, longest work item waiting time, longest agent idle state, etc.) may be considered at an ACD located at a particular site and those variables may be input to a decision-making algorithm to determine whether that site is available (or not) to receive more work item assignments. The results of this decision are simplified to a single bit that indicates a "yes/no I can receive work" and additional bits within the same byte can be used to describe a degree of urgency and availability to receive work item assignments and/or any other type of information that can be useful in making a work item routing decision. All of this state information can be maintained within a single contiguous memory segment (i.e., within a common byte or less).

It should be noted that the use of a single byte is advantageous because there would be no requirement for endian translation. Furthermore, mapping between data sets is also more efficient if units of bytes are used to describe a skill. It should be noted however, that a byte is only one recommendation of granularity and other memory sizes can be used without departing from the scope of the present invention.

The single byte is shared with other sites, at a minimum with sites containing work item routing logic, and used to make routing decisions for work items. If the byte indicates an availability to receive work items, then the routing engine is free to send work items to that reporting site. If the byte indicates a non-availability to receive work items, then the routing engine does not send work items to the reporting site. Additionally, resources and work items can be shared between sites in the multisite contact center if the states of various sites dictate such a possibility.

In accordance with at least some embodiments of the present invention, it may also be possible to represent state information for two or more skills with a single byte. As one example, four bits of a byte may represent state information for a first skill and the other four bits of the byte may represent state information for a second skill.

The algorithm used to determine whether a particular site is available to receive work items may only care whether the site is available to receive one or more work items. Once the threshold (as determined by a policy) is reached whereby the site is no longer able to efficiently process work items (e.g., the site is no longer available to receive one or more work items), the algorithm will alter the value of the bit and report the same to other sites. In accordance with at least some embodiments of the present invention, there may be no need to report state information unless the value of a byte or bit within that byte changes.

Levels of urgency may also be indicated within a byte using predefined byte values. For example, two bits of a byte may broadly identify a state of a particular skill. U.S. patent application Ser. No. 10/673,103, the entire contents of which are hereby incorporated herein by reference, describes the use of advocate states in connection with describing contact center states at a relatively high level. For instance, a '00' may indicate a low level of urgency to receive work (e.g., a need to keep resources busy), a '01' may indicate a moderate level of urgency to receive work, a '10' may indicate a high level of urgency to receive work, and a '11' may indicate an extreme level of urgency to receive work. Conversely, if another bit in the same byte indicates that there is a need to distribute work rather than receive work (e.g., there is a work item surplus as opposed to a resource surplus), then a '00' may indicate a low level of urgency to distribute work (e.g., a particular contact center site is in a future risk state), a '01' may indicate a moderate level of urgency to distribute work (e.g., the contact center site is in an immediate risk or almost critical state), a '10' may indicate a high level of urgency to distribute work (e.g., the contact center is behind target), and a '11' may indicate an extreme urgency to distribute work (e.g., the contact center is in a critical state).

Thus, referring to the example above, three bits within a byte may be used to express up to eight contact center states and this information may be more than enough to assist in making a work item routing decision. Furthermore, the three bits can indicate whether there is a work item or resource surplus and the level of urgency associated with the identified surplus. If more information is needed to define the level of urgency, then more bits may be used to further describe the level of urgency. This is but one example of mapping a complex state to urgency, but other examples can be envisioned by those skilled in the art.

This ultimately results in the ability to include skill state information for a plurality of skills in a single message, which in turn reduces the number of messages required to share skill state information. One skilled in the art will appreciate that this can reduce network bandwidth consumption in a distributed contact center.

In accordance with at least some embodiments of the present invention, a message may be adapted to carry skill state information for a plurality of skills at a particular contact center site. In some embodiments the message may comprise a Maximum Transmission Unit (MTU) in bytes. Since a single skill can be expressed in a single byte, a single message may be adapted to describe a number of skills equal to the message's MTU (e.g., a message with 1500 MTU (as used in Ethernet) may describe 1500 skills). Other message sizes and MTUs may be used depending upon network parameters and capabilities. As noted above, it may also be possible to express two or more skills in a single byte, thereby enabling a message to describe a number of skills greater than the message's MTU. Since most contact centers only have around 1500 defined skills it may be possible for a contact center site to share all of its state information in a single message. This will vastly reduce the amount of bandwidth consumed when sharing state information. Furthermore, since so much bandwidth is being saved due to the intelligent description of skill state information in a bit or byte, the periodicity with which state updates are transmitted may be increased, thereby increasing system-wide knowledge and also increasing the accuracy with which work item routing decisions are made.

In accordance with at least some embodiments of the present invention a method is provided that generally comprises:

determining a state of a first skill at a first site in a contact center;

determining a state of a second skill at the first site in the contact center;

generating a message comprising state information, the state information representing the state of at least the first and second skills; and transmitting the message to a second site in the contact center.

As can be appreciated by one of skill in the art, a contact as used herein is understood to include voice calls, emails, chat, video calls, fax, Instant Messages (IMs), collaboration software, desktop sharing, conferences, and combinations thereof. Accordingly, a contact center may be equipped to handle any one or a number of the above-noted contacts.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any computing application in which it is desirable to distribute a large amount of state information to interested parties.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
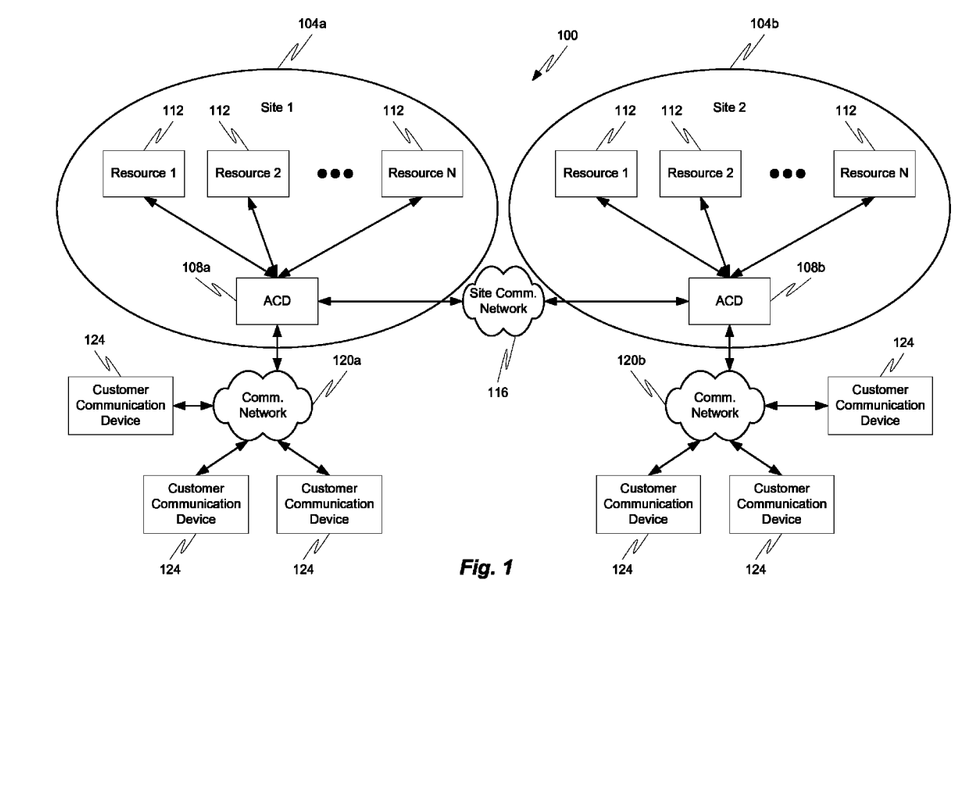
FIG. 1 is a block diagram depicting a communication system in accordance with embodiments of the present invention.

FIG. 1 shows an illustrative embodiment of a communication system 100 in accordance with at least some embodiments of the present invention. The communication system 100 generally comprises a distributed contact center having at least first and second contact center sites 104a, 104b, respectively. These different contact center sites 104a, 104b may be owned and operated by a common company but may be separated by a predetermined distance. In accordance with at least some embodiments of the present invention, the first site 104a and second site 104b may be separated by an ocean or some other large body of water. As another example, the first site 104a and second site 104b may reside in different countries or different states within a country.

Each site 104a, 104b may also comprise its own ACD 108a, 108b, respectively. The ACD of one or both sites may be adapted to make work item routing decisions by applying a common set of routing rules. In other embodiments, one of the ACDs may only be provided with work item routing logic and the other ACD may simply follow work item routing decisions made by the ACD with the routing logic. In such an embodiment, one site or ACD may be referred to as the controlling or managing site and other sites or ACDs may be referred to as controlled or managed sites.

Furthermore each ACD may also be adapted to distribute work items received at the ACD to a plurality of resources 112 within the site 104a, 104b. As can be appreciated by one skilled in the art, the resources 112 of a particular site 104a, 104b may not necessarily reside within a particular site but may remotely connect to the ACD 108a, 108b via some sort of secured connection over a communication network. As one example, a contact center agent may be allowed to work remotely but connect their remote work station to the ACD 108a, 108b of a particular site 104a, 104b using a secure connection such as a VPN, IPsec, or the like. Thus, the contact center site 104a, 104b may also be distributed in the sense that its resources 112 may not necessarily reside on a common premises.

The contact center sites 104a, 104b may be in communication with one another via a site communication network 116. The site communication network 116 provides the sites 104a, 104b with the ability to communicate skill state information between sites and possibly share work items and/or resources 112 between sites, thereby allowing the distributed contact center to operate as a centralized contact center even though the distributed contact center has two (or more) separated sites 104a, 104b.

Each site 104a, 104b may also be connected with a communication network 120a, 120b, via which work items generated at customer communication devices 124 are received at the ACD 108a, 108b of the site 104a, 104b. Although each site 104a, 104b is depicted as being connected to different communication networks 120a, 120b, one skilled in the art will appreciate that both sites 104a, 104b may be connected to the same network, but may simply receive work items from different customer communication devices 124. Furthermore, even though the site communication network 116 is depicted as being different from the communication networks 120a, 120b, one skilled in the art will appreciate that the sites 104a, 104b may use the same network to share skill state information and connect with customer communication devices 124.

In accordance with at least some embodiments of the present invention, the communication networks 116, 120a, 120b may comprise any type of known communication medium or collection of communication mediums and may use any type of protocols to transport messages between endpoints. The communication networks 116, 120a, 120b may include wired and/or wireless communication technologies. The Internet is an example of the communication network 116, 120a, 120b that constitutes and IP network consisting of many computers, computing networks, and other communication devices located all over the world, which are connected through many telephone systems and other means. Other examples of the communication network 116, 120a, 120b include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 116, 120a, 120b need not be limited to any one network type, and instead may be comprised of a number of different networks and/or network types. Moreover, the communication network 116, 120a, 120b may comprise a number of different communication mediums such as coaxial cable, copper cable/wire, fiber-optic cable, antennas for transmitting/receiving wireless messages, and combinations thereof.

The customer communication devices 124 may correspond to communication devices used by customers of the contact center to initiate contact which ultimately result in the creation of a work item in the contact center. In accordance with at least some embodiments of the present invention, a customer may utilize their communication device 124 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 116, 120a, 120b. For example, the work item may be transmitted as a telephone call, a packet or collection of packets (e.g., IP packets transmitted over an IP network), an email message, an Instant Message, an SMS message, a fax, and combinations thereof.

The format of the work item may depend upon the capabilities of the communication device 124. In accordance with at least some embodiments of the present invention, the commmunication devices 124 may comprise any type of known communication equipment or collection of communication equipment. Examples of a suitable communication device 124 include, but are not limited to, a personal computer, laptop, Personal Digital Assistant (PDA), cellular phone, smart phone, telephone, or combinations thereof In general each communication device 124 may be adapted to support video, audio, text, and/or data communications with other communication devices 124 as well as the processing resources 112.

The resources 112 may correspond to human agents, work stations operated by human agents, or fully automated resources such as an IVR, application server, voicemail server, or the like. The resources 112 may have one or more skills and a level of proficiency or capability for each of the one or more skills. In accordance with at least some embodiments of the present invention, a human skill may correspond to a language ability, an ability to handle a particular type of work item (e.g., troubleshooting, billing question, customer questions, maintenance, etc.), an ability to handle certain types of customers (e.g., general customers, higher priority customers, and highest priority customers), and the like. A machine skill may correspond to a number of ports, a processing capacity, a memory capacity, a web skill, hardware available, etc. In some embodiments, a human utilizing a particular type of work station may also have certain skills such as the ability to handle a certain type of work item (e.g., an agent using a work station with video capabilities has a video skill whereas an agent using a work station without video capabilities does not have a video skill).

Figure 2A:
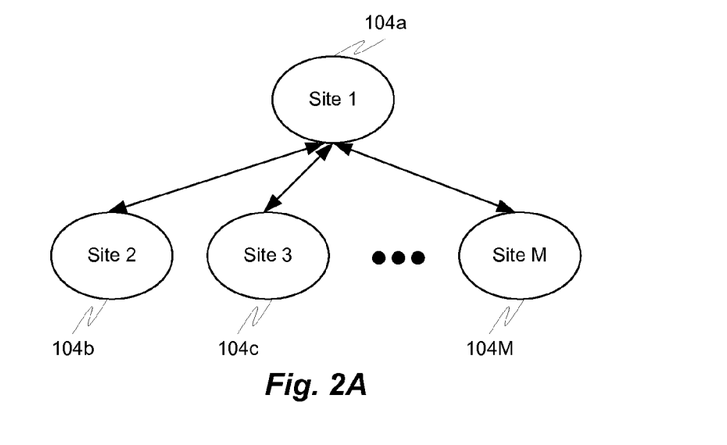
FIG. 2A is a block diagram depicting a first exemplary site topology in accordance with embodiments of the present invention.
Figure 2B:
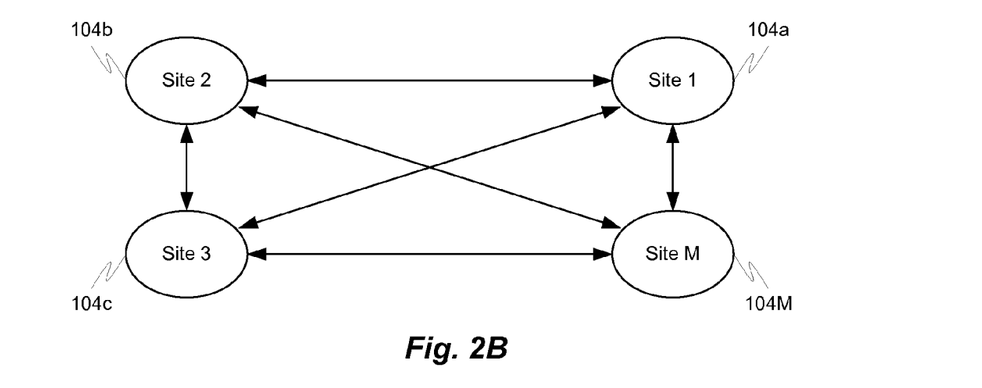
FIG. 2B is a block diagram depicting a second exemplary site topology in accordance with embodiments of the present invention.
Figure 2C:
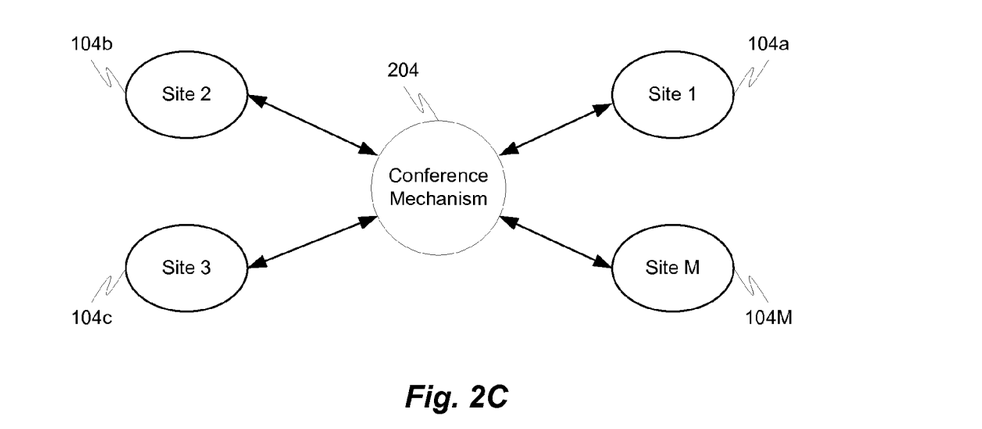
FIG. 2C is a block diagram depicting a third exemplary site topology in accordance with embodiments of the present invention.

Although only two sites 104*a*, 104*b* are depicted in FIG. 1, one skilled in the art will appreciate that a distributed contact center may have three, four, five, or more sites without departing from the scope of the present invention. Furthermore, embodiments of the present invention may be employed in any type of site topology. FIGS. 2A, 2B, and 2C depict three such topologies that may be used in accordance with at least some embodiments of the present invention. These are not the only types of topologies that may be employed, but simply represent three such examples.

Referring initially to FIG. 2A, a tree-type topology is depicted whereby a first site 104*a* may be responsible for communicating with other sites 104*b*, 104*c*, 104M in the contact center. In this particular topology, the first site 104*a* may comprise the work item routing logic and all other sites may only be responsible for processing work items routed thereto from the first site 104*a*. In other words, the first site 104*a* may be the workload manager and the other sites 104*b*, 104*c*, 104M may be managed sites having ACDs 108 with a lesser capacity than the ACD 108 at the first site 104*a*.

FIG. 2B depicts another topology that may be employed in accordance with at least some embodiments of the present invention. FIG. 2B depicts a fully distributed topology where every site 104*a*-104M is capable of communicating with all other sites in a point-to-point fashion. This particular topology may be useful in certain situations where complete state sharing is desired and where each site 104*a*-104M comprises a fully functional ACD 108. U.S. patent application Ser. No. 11/619,504 to Davis et al., the entire contents of which are incorporated herein by reference, describes how to utilize Session Initiation Protocol (SIP) and a Real-time Transport Protocol (RTP) to communicate data between separate communication elements. This particular patent application proposed to use the capabilities of SIP to find and connect two endpoints and establish an RTP session between the endpoints.

FIG. 2C depicts yet another topology which may be employed in accordance with at least some embodiments of the present invention. FIG. 2C depicts a conference topology where each site 104*a*-104M communicates with the other sites via a conference mechanism 204. Additional details related to using such a conference mechanism 204 are described in more detail in U.S. patent application Ser. No. 12/239,120 to Steiner et al., the entire contents of which are incorporated herein by reference. The use of a conference call structure allows various sites 104*a*-104M in a contact center to efficiently disseminate status information with other interested parties without broadcasting to the entire contact center. This greatly reduces the number of messages that need to be sent across the communication network thereby reducing bandwidth utilization.

As can be appreciated by one skilled in the art, combinations of the above-described topologies may be employed in a distributed contact center in accordance with at least some embodiments of the present invention. Furthermore, a distributed contact center may also employ other types of known or yet to be developed network topologies and technologies to further increase its overall operating efficiency.

Figure 3:
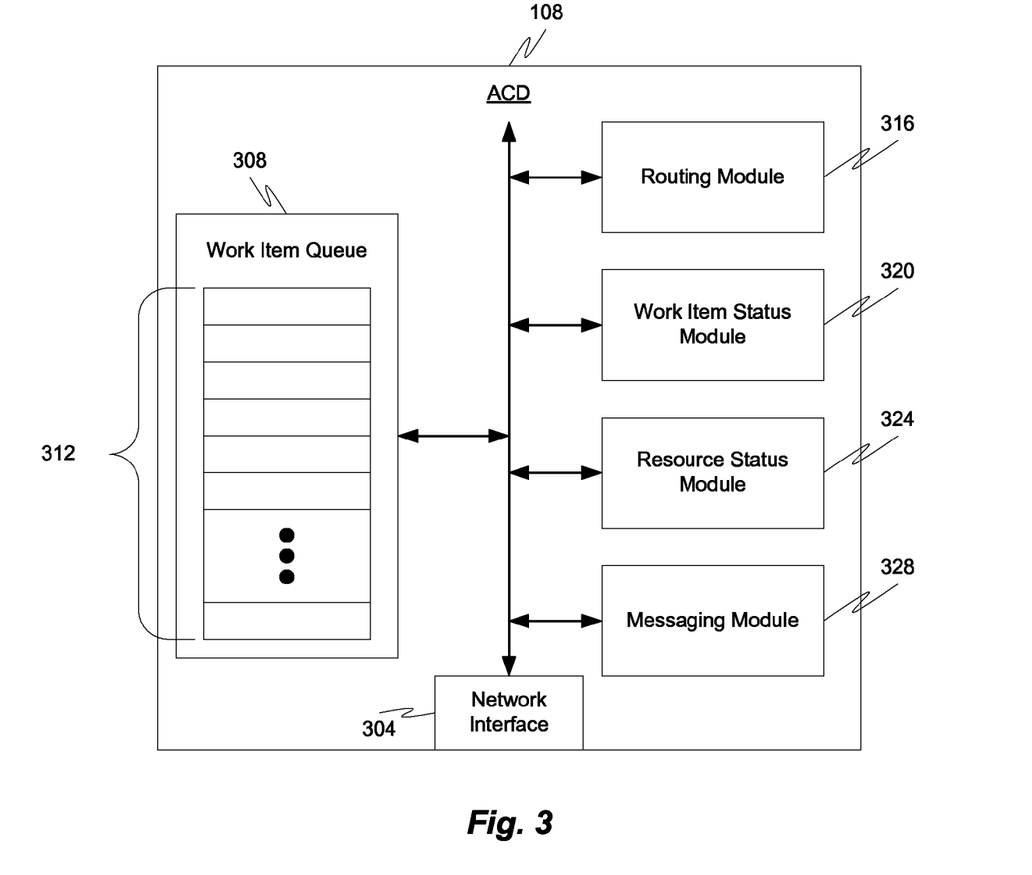
FIG. 3 is a block diagram depicting components of an exemplary ACD in accordance with embodiments of the present invention.

With reference now to FIG. 3, an exemplary ACD 108 will be described in accordance with at least some embodiments of the present invention. The depicted ACD 108 includes a network interface 304 which allows the ACD 108 to connect to one or more of the communication networks 116, 120*a*, 120*b*. The network interface 304 may include a wired or wireless communication port and any associated hardware/software needed to modulate or demodulate signals for transmission over or signals received from the communication network 116, 120*a*, 120*b*.

The ACD 108 may also comprise a work item queue 308 having a plurality of queue positions 312. When a work item is received at the ACD 108, the ACD may place the work item in the work item queue 308 if no resources 112 are currently available to process the work item. If a resource 112 is currently not available to receive a work item, then the work item is placed in a queue position 312. The work item queue 308 is generally a FIFO queue where first received work items are the first work items routed to the next available resource 112. This logic can be altered, however, to accommodate higher priority work items and/or higher priority customers. Other types of queues may be employed in accordance with embodiments of the present invention such as policy based queues, universal queues, and any other type of queue employing a known type of queue logic. Similarly, different types of resource selection algorithms may be used other than longest wait time. Examples of such selection algorithms may include policy based routing algorithms, need-based routing algorithms, customer priority routing algorithms, and the like.

As can be appreciated, the ACD 108 may comprise a plurality of work item queues 308 for supporting different types of work items. As one example, an ACD 108 may comprise a work item queue 308 for normal work items and other work items queues for higher priority work items. Similarly, an ACD 108 may comprise a number of different work items queues corresponding to different skills or processing needs of work items.

Although not depicted, the ACD 108 may further comprise a resource queue where available resources are placed in the event of a resource surplus, where resources 112 are idle and waiting for a new work item to enter the contact center. The resource queue may be similar in construction to the work item queue 308 in that it has a number of queue positions and resources 112 may be assigned a queue position according to longest idle time.

In accordance with at least some embodiments of the present invention, the ACD 108 may comprise a number of resource queues corresponding to the various skills defined in the contact center. In some embodiments, if a plurality of work item queues 308 and resource queues are provided for different skills, then it may be possible to pair each work item queue 308 with a resource queue having a corresponding skill. This allows each skill to have either a work item surplus or a resource surplus. If all resources for a particular skill are currently processing a work item requiring such a skill and other work items are waiting in the corresponding work item queue 308, then that skill is determined to have a work item surplus. Conversely, if one or more resources for a particular skill are waiting in a resource queue to receive a work item having a corresponding skill, then that skill is determined to have a resource surplus.

The ACD 108 may comprise one or more modules for determining the status of a particular skill. More specifically, the ACD 108 may comprise a routing module 316 for making work item routing decisions, a work item status module 320 for determining whether there is a work item surplus for a particular skill and the extent of such a surplus, a resource status module 324 for determining whether there is a resource surplus for a particular skill and the extent of such a surplus, and a messaging module 328 for generating status reporting messages and handling inbound status reporting messages from other ACDs 108 in accordance with at least some embodiments of the present invention.

Although depicted as two separate modules, the work item status module 320 and resource status module 324 may be combined into a single module that is capable of determining a status of one, two, or all of the skills of the contact center. In some embodiments, each combination of work item queues 308 and resource queues may comprise a dedicated module or set of modules for determining a status of the skill shared between the queues. In other embodiments, a single module or set of modules may be adapted to determine the status of a plurality of skills.

Exemplary capabilities of the work item status module 320 and/or resource status module 324 are described in further detail in U.S. patent application Ser. No. 10/673,103, the entire contents of which are hereby incorporated herein by reference. The '103 application describes the ability to determine an advocate state of one or more contact center skills. An advocate state may include a broad definition of a skill state. Non-limiting examples of an advocate state that may be used to define the extent of a particular work item surplus or resource surplus include, but are not limited to, agents available, ahead of schedule, normal/on target, future risk, immediate risk/almost critical, behind target, and critical. More advocate states may be used to describe the degree of a work item or resource surplus if more detailed information is needed to help make a work item routing decision.

The routing module 316 may be adapted to examine the various skill states of each and make work item routing decisions based on that state. As one example, the routing module 316 may be adapted to move resources from one resource queue to another resource queue if the other resource queue has a future risk, immediate risk, behind target or critical state. As another example, the routing module 316 may transfer work items from a work item queue 308 to another contact center site 104 if that other site has a resource surplus for the same skill. As still another example, the routing module 316 may assign resources to other skills or other sites if that resource 112 is in a resource queue having an agent available or ahead of schedule state. Other types of routing decisions that are well known may also be made by the routing module 316, such as moving a work item from one skill queue to another skill queue.

The messaging module 328 is provided to generate, send, and/or receive messages that describe the skill state of the various skills in the ACD. In accordance with at least some embodiments of the present invention, the messaging module 328 may be adapted to generate messages that describe the skill state of a plurality of skills. More specifically, the state of a skill may be described by indicating whether there is a work item or resource surplus and an advocate state of the determined surplus. Furthermore, the state of the skill may be described to indicate other variables or quantitative values that can be used to help make a routing decision. As an example, the state information for a particular skill may include (i) whether there is a resource surplus or work item surplus, (ii) an advocate state of the skill, and (iii) a variable value or range of variable values, where the variables described may include one or more of estimated wait time, longest wait time, average wait time, estimated idle time, longest idle time, average idle time, Required Queue Position (RQP), or the like. This information can be supplied to other ACDs 108 in the contact center to help make an informed work item routing decision.

Some or all of the modules and/or queue may be provided on the ACD 108 as free-standing hardware modules. Alternatively, or in addition, the modules and/or queue may be included as instructions stored in a computer-readable medium, such as local memory. In such an embodiment, the ACD 108 may also include a processor for executing the instructions stored on the computer-readable medium.

Figure 4:
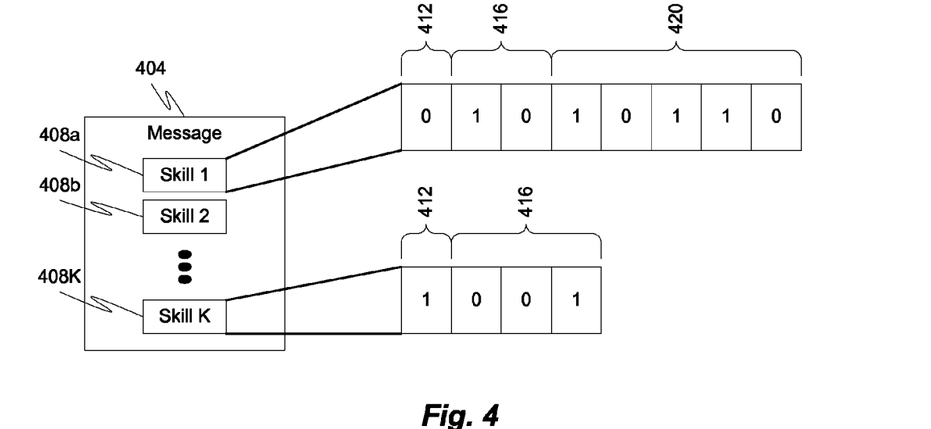
FIG. 4 is a block diagram depicting an exemplary message structure in accordance with embodiments of the present invention.

Referring now to FIG. 4, an exemplary message 404 generated by an ACD 108 and used to share skill state information with other ACDs 108 or contact center sites 104 will be described in accordance with at least some embodiments of the present invention. The message 404 may comprise a number of bytes up to its MTU in bytes. As can be appreciated by one skilled in the art, not all of the bytes available for use by a message need to be utilized to carry information.

The message 404 may comprise skill state information for a plurality of skills 408a-K, where K is greater than one and may even be greater than the MTU of the message, depending upon how many bits are used to describe a particular skill state. In accordance with at least some embodiments of the present invention a single byte may be used to describe the state of a particular skill 408a. If an entire byte is used to represent the state of a skill 408a, then eight bits are available to describe the skill state. The byte may comprise a number of portions 412, 416, 420, where each portion describes a different aspect of the skill state. In accordance with at least one embodiment of the present invention, the first portion 412 may correspond to a single bit. The value of this particular bit in the first portion 412 may be altered to represent whether the skill is in a work item surplus state or a resource surplus state. Thus, a '0' value in the first portion 412 may indicate one of the surpluses (e.g., a work item surplus) and a '1' value in the first portion 412 may indicate the other of the surpluses (e.g., a resource surplus). If there is neither a resource surplus nor a work item surplus, then a default state may be selected and the value of the bit in the first portion may be set to the value corresponding to the default state.

The second portion 416 may utilize one or more bits in the byte to further describe the severity of the determined work item surplus or resource surplus. As an example, two bits in the second portion 416 may be used to describe the advocate state of the skill. Accordingly, the first three bits in the byte may be used to describe up to eight different skill states.

The third portion 420 can be used to numerically describe a further aspect of the skill state. As an example, it may be desirable to know a longest work item waiting time or a longest resource idle time with more particularity than can be described in the first and second portions 412, 416. More specifically, it may be necessary to determine a waiting or idle time within a particular range such that other ACDs 108 can collectively determine if work items should be shared between ACDs 108. Thus, the third portion 420 can be used to describe more particular details related to the skill state.

Although three portions are depicted in the byte describing the skill state of the first skill 408a, one skilled in the art will appreciate that a greater (up to eight) or lesser number of portions may be utilized to describe a skill state with a single byte. Furthermore, embodiments of the present invention are not precluded from utilizing two or more bytes to describe the state of a particular skill; however, certain advantages can be obtained by utilizing a single byte to describe the state of one or more skills.

Figure 5:
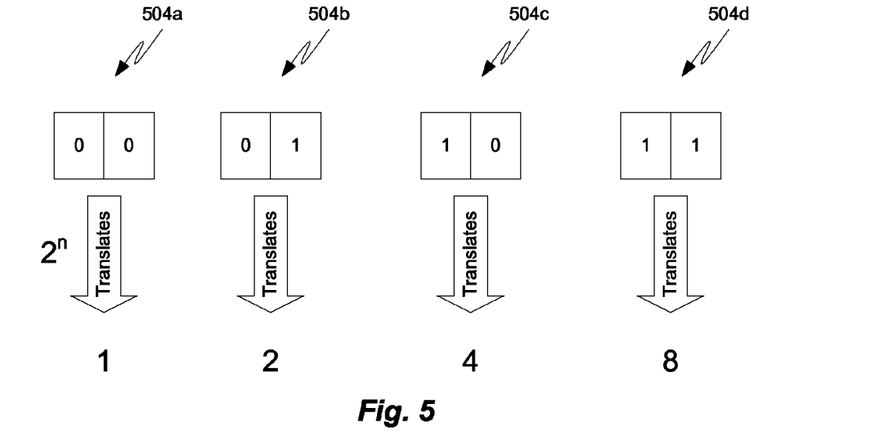
FIG. 5 is a block diagram depicting a first exemplary bit translation scheme in accordance with embodiments of the present invention.

If enough bits are available to particularly describe the desired information, then traditional binary values can be utilized. However, it may also be possible to use a predetermined bit translation to describe a value within a particular range or with respect to some other non-incremental value. FIG. 5 depicts one example of a bit translation that can be used when sharing skill state information. More specifically a two to the power of n (where "n" represents the bit value) can be used to represent a variable value or the fact that a variable value is less than (or greater than) or equal to a particular value. Consider for example that longest work item wait time for a particular skill is being described with two bits. A first state of the bits 504a may be translated to a first value of '1', meaning that the longest work item wait time is less than or equal to one. A second state of the bits 504b may be translated to a second value of '2', meaning that the longest work item wait time is less than or equal to two. A third state of the bits 504c may be translated to a third value of '4', meaning that the longest work item wait time is less than or equal to four. A fourth state of the bits 504d may be translated to a fourth value '8', meaning that the longest work item wait time is less than or equal to eight. If more bits are used to describe a value, then additional translations may be used.

Figure 6:
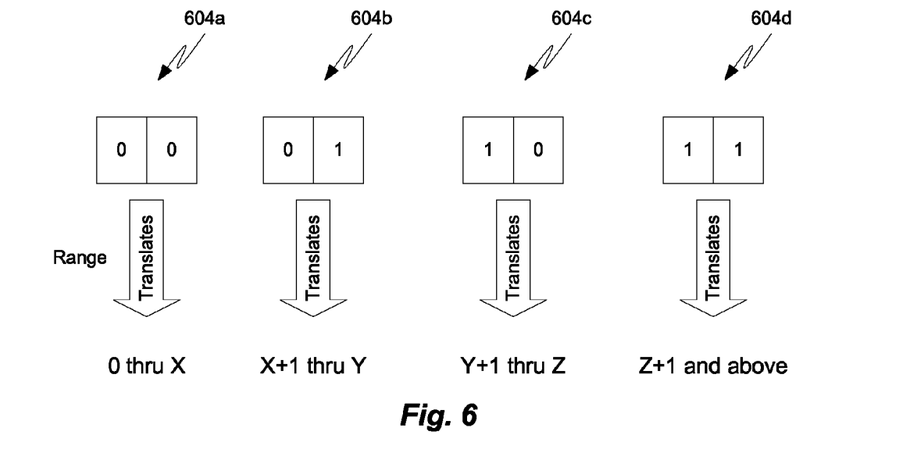
FIG. 6 is a block diagram depicting a second exemplary bit translation scheme in accordance with embodiments of the present invention.

Another exemplary translation is depicted in connection with FIG. 6. Rather than using power-to translation, a predetermined (or pre-negotiated) range of values may determined or agreed upon by all ACDs 108 in the contact center. In this particular embodiment, a first state of the bits 604a may correspond to a first range, a second state of the bits 604b may correspond to a second range, a third state of the bits 604c may correspond to a third range, and a fourth state of the bits 604d may correspond to a fourth range. The predefined ranges or values that define the range may or may not correspond to an incrementally increasing range or a uniform range. It may be useful to describe ranges with uniform size or it may be useful to describe ranges with non-uniform sizes. Other types of bit translations may also be used to further describe skill state without departing from the scope of the present invention.

Figure 7:
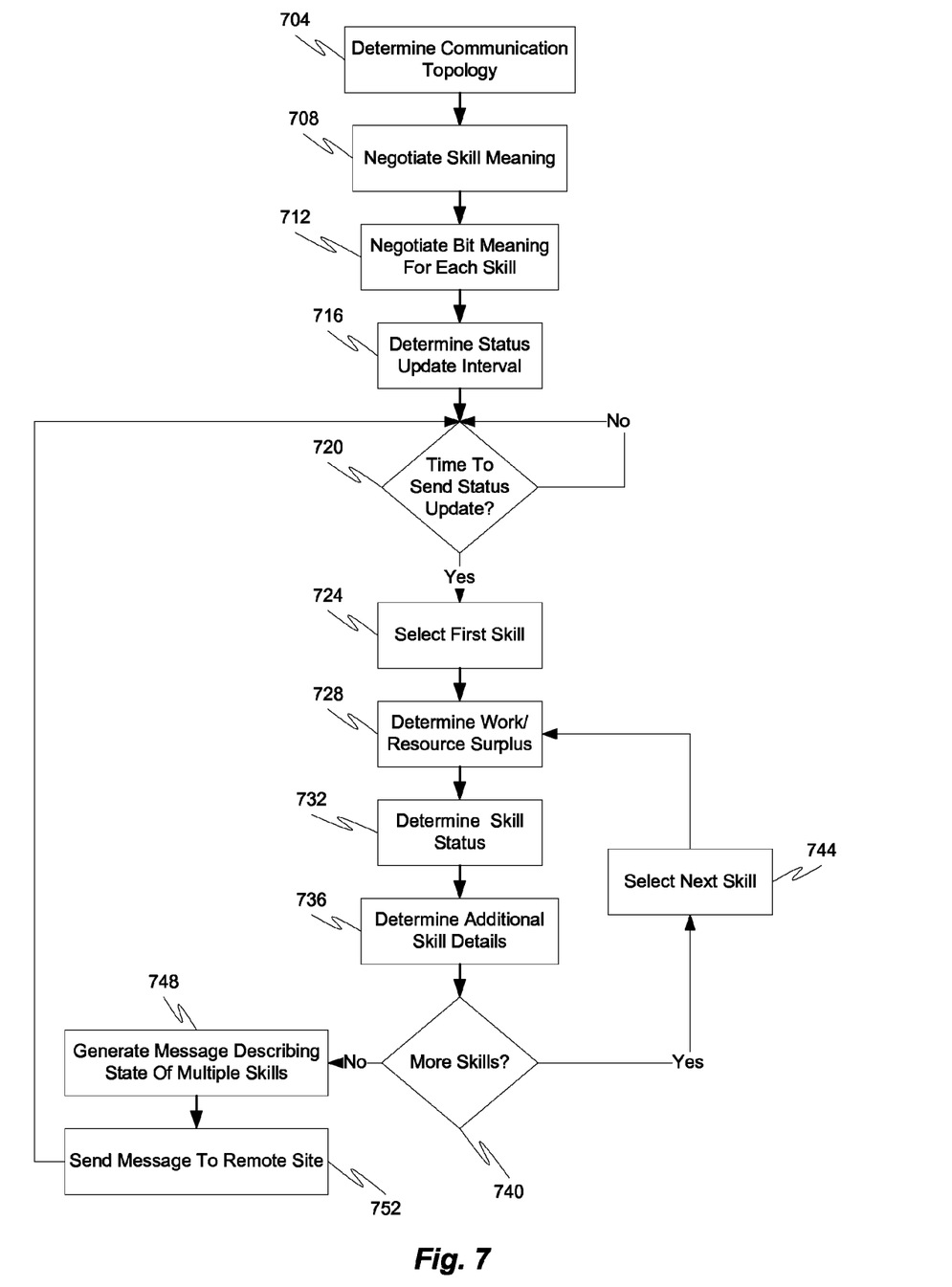
FIG. 7 is a flow diagram depicting an exemplary service state sharing method in accordance with embodiments of the present invention.

Referring now to FIG. 7, an exemplary method of operating a distributed contact center will be described in accordance with at least some embodiments of the present invention. Initially, a communication or network topology is determined (step 704). This determination will help to determine which ACDs 108 or sites 104 will need to communicate their skill state information and which ACDs 108 or sites 104 will need to receive such information. Furthermore, the communication channels used to share such skill state information may also be determined in this step, particularly if a conference mechanism 204 will be used.

The method continues with the ACDs 108 negotiating the various meanings, definitions, and/or identifiers for a particular skill (step 708). In other words, since multiple skills may be described in a single message it may become necessary to identify each skill that is being described. This identification may be done by negotiating that a particular byte in a message will be used to carry skill state information for a particular skill. Alternatively, the identification may correspond to negotiating a particular number that will be assigned to each skill. Therefore, when that skill is being described, the identifier associated with the skill is also provided to help the ACD 108 receiving the message determine which skill is being described by the sending ACD 108. Rather than being negotiated, these meanings may be provisioned by a contact center system administrator or some other user with administrative authority.

Once skill meanings have been agreed upon, the method continues by negotiating, determining, or having provisioned the bit meaning for each skill (step 712). In other words, the ACDs 108 determine which bits of a particular byte will be used to describe certain information and how many different portions the byte will have. As an example, it may be necessary to negotiate that the first bit represents whether there is a resource or work item surplus. Of course, the last bit in a byte can alternatively be used to represent the same information. There is no requirement as to the structure used by the byte to describe a skill state. Rather, it is only important to ensure that all communicants agree to or at least understand what information is being conveyed in each bit or collection of bits.

After the bit meaning for each skill has been determined, the method continues by determining the status update interval that will be used by the ACDs 108 to share skill state information with other ACDs 108 (step 716). In accordance with at least some embodiments of the present invention, skill state updates may be sent out in a much more frequent manner than was possible using prior art methods. As one example, skill state updates can be sent out every five seconds, every second, or every clock cycle, which is usually a fraction of a second. It is possible to have these highly frequency skill state updated because there is not as much bandwidth needed to describe the states of many skills, particularly if a single message can be used to carry skill state information for every skill in the contact center. It may also be possible to trigger skill state updates based on the occurrence of an event or collection of events rather than basing it on a passage of a predetermined amount of time. For example, it may be possible to send skill state updates whenever some skill changes advocate states, when a skill changes from a work item surplus to a resource surplus, or when a bit value describing the skill state would change. If there is no change in skill state it may be possible to wait a relatively long amount of time between skill state updates, but a longer predetermined amount of time (e.g., one minute) may be set as a default for sending a skill state update if no changes occur within that predetermined amount of time.

After the status update interval has been determined, the method continues by determining if it is time to send a status update from one or more of the ACDs 108 (step 720). If this query is answered negatively, then the method waits in step 720 until it is time to send a status update.

Upon determining that it is time to send a status update, the method continues by selecting a first skill (step 724) and determining whether that particular skill has a resource or work item surplus (step 728). Thereafter, the advocate state of the skill is determined (step 732) and then any additional details needed to help make a routing decision are made (step 736). All of the determined information can then be included in a single byte of information for inclusion in a message which will be transmitted to other ACDs 108 in the contact center.

The method continues by determining if there are more skills that need to have their status analyzed (step 740). If more skills remain to be analyzed, then the method continues by selecting the next skill for analysis (step 744) and then returning to step 728.

Once all skills of the contact center have been analyzed (or at least after enough skills have been analyzed to populate a message), the method continues by invoking the messaging module 328 which generates a message describing the multiple skill states that have just been determined (step 748). The skill states are described in a manner consistent with the negotiated skill and bit meaning. Once generated, the messaging module 328 transmits the message via the network interface 304 to one or more target ACDs 108 (step 752). Thereafter, the method returns to step 720.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for efficiently sharing state information between remote sites, such as in a distributed contact center architecture. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   determining a state of a first skill at a first site in a contact center;
   determining a state of a second skill at the first site in the contact center;
   generating a message comprising state information, the state information comprising the state of the first skill at the first site and the state of the second skill at the first site; and
   transmitting the message to a second site in the contact center,
   wherein the message comprises a maximum transmission unit in bytes and wherein the number of skills having a respective state described in the state information is greater than or equal to the maximum transmission unit of the message.

2. The method of claim 1, wherein the state information describes two or more of (i) whether there is a resource surplus for the first skill, (ii) whether there is a resource surplus for the second skill, (iii) a status of the resource surplus for the first skill, (iv) a status of the resource surplus for the second skill, (v) whether there is a work item surplus for the first skill, (vi) whether there is a work item surplus for the second skill, (vii) a status of the work item surplus for the first skill, and (viii) a status of the work item surplus for the second skill.

3. The method of claim 1, further comprising:
   receiving the message at the second site;
   analyzing the state information in the message; and
   making a work item routing decision based on the state information in the message.

4. The method of claim 1, wherein the maximum transmission unit is 1500 bytes and wherein at least 1500 skills at the first site have their state described in the state information.

5. The method of claim 1, wherein transmitting comprises one or more of (i) sending the message directly to the second site, (ii) sending the message to a conference mechanism to which the second site is also connected, and (iii) sending the message to a third site which relays the message to the second site.

6. The method of claim 1, wherein the state information represents an advocate state of at least the first and second skills, wherein the advocate state includes one or more of resources available, ahead of schedule, normal, future risk, immediate risk, behind target, and critical.

7. A method, comprising:
   determining a state of a first skill at a first site in a contact center;
   determining a state of a second skill at the first site in the contact center;
   generating a message comprising state information, the state information representing the state of at least the first and second skills; and
   transmitting the message to a second site in the contact center;
   wherein the determining, generating, and transmitting steps are performed at a predetermined rate that is less than once every 5 seconds, wherein the message comprises a maximum transmission unit in bytes and wherein the number of skills having their state described in the state information is greater than or equal to the maximum transmission unit of the message.

8. The method of claim 7, wherein the predetermined rate is less than once every second.

9. The method of claim 7, wherein the predetermined rate is once every clock cycle.

10. An automated contact distributor configured to distribute contacts among a plurality of resources in a contact center, wherein the contact center comprises at least two sites and wherein the automated contact distributor is located at a first of the at least two sites, the automated contact distributor comprising:
- a work item queue comprising a plurality of queue positions for assignment to one or more work items received at the automated contact distributor;
- a status module adapted to determine a state for each of a plurality of skills associated with the first site; and
- a messaging module adapted to generate a message comprising state information, wherein the state information represents a state for each of two or more skills determined by the status module,
- wherein the message comprises a maximum transmission unit in bytes and wherein the number of skills having a respective state described in the state information is greater than or equal to the maximum transmission unit of the message.

11. The automated contact distributor of claim 10, wherein the state information for each of the two or more skills describes two or more of (i) whether there is a resource surplus for the corresponding skill, (ii) a status of the resource surplus, (iii) whether there is a work item surplus for the skill, and (iv) a status of the work item surplus.

12. The automated contact distributor of claim 11, further comprising a network interface, wherein the network interface connects the automated contact distributor to a communication network and is used to transmit messages generated by the messaging module to a second site of the at least two sites.

13. The automated contact distributor of claim 12, wherein messages describing a plurality of skill states of other sites in the contact center and transmitted by other automated contact distributors in the contact center are received at the network interface and wherein skill states contained within the messages received at the network interface are analyzed to make a work item routing decision.

14. The automated contact distributor of claim 10, wherein the state information represents an advocate state of the two or more skills, wherein the advocate state includes one or more of resources available, ahead of schedule, normal, future risk, immediate risk, behind target, and critical.

15. An automated contact distributor configured to distribute contacts among a plurality of resources in a contact center, wherein the contact center comprises at least two sites and wherein the automated contact distributor is located at a first of the at least two sites, the automated contact distributor comprising:
- a work item queue comprising a plurality of queue positions for assignment to one or more work items received at the automated contact distributor;
- a status module adapted to determine a state for each of a plurality of skills associated with the first site; and
- a messaging module adapted to generate a message comprising state information, wherein the state information represents a state for each of two or more skills determined by the status module, wherein the message comprises a maximum transmission unit in bytes and wherein the number of skills having a respective state described in the state information is greater than or equal to the maximum transmission unit of the message.

16. The automated contact distributor of claim 15, wherein the maximum transmission unit is 1500 bytes and wherein at least 1500 skills at the first site have their state described in the state information.

17. A message generated by or received at an automated contact distributor, the message representing state information for two or more skills associated with a resource, wherein the state information is the status of the state of each of the two or more skills,
- wherein the message comprises a maximum transmission unit in bytes and wherein the number of skills having a respective state described in the state information is greater than or equal to the maximum transmission unit of the message.

18. The message of claim 17, wherein the state information for each of the two or more skills describes two or more of (i) whether there is a resource surplus for the corresponding skill, (ii) a status of the resource surplus, (iii) whether there is a work item surplus for the skill, and (iv) a status of the work item surplus.

19. A message generated by or received at an automated contact distributor, the message representing state information for two or more skills associated with a resource, further comprising a maximum transmission unit in bytes and wherein the number of skills having a corresponding state described in the state information is greater than or equal to the maximum transmission unit of the message.

* * * * *